Dec. 7, 1948.  P. PEILLON  2,455,441
ARC WELDING WITHIN HYDROCARBON OIL
Filed Aug. 16, 1944
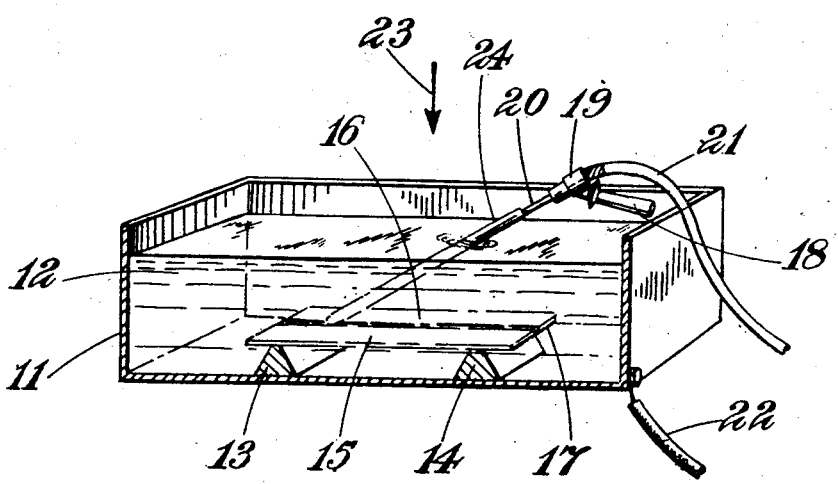
INVENTOR
Paul Peillon
By Watson, Cole, Grindle & Watson
ATTY.

Patented Dec. 7, 1948

2,455,441

UNITED STATES PATENT OFFICE 2,455,441

ARC WELDING WITHIN HYDROCARBON OIL

Paul Peillon, Cairo, Egypt, assignor to Salvage & Marine Company of Egypt S. A. E., Cairo, Egypt, an Egyptian company Application August 16, 1944, Serial No. 549,651
In Great Britain December 31, 1942

Section 1, Public Law 690, August 8, 1946
Patent expires December 31, 1962

5 Claims. (Cl. 219—10)

This invention comprises improvements in or relating to electric arc welding.

It is an object of the invention to provide an improved process of electric arc welding in which access of air to the arc with consequent oxidation of the welding metal or hardening of the metal by the action of nitrogen in the atmosphere is obviated or minimised.

According to the present invention a process of electric arc welding is characterised by being carried out beneath the surface of a non-conducting liquid. The liquid serves to exclude the atmosphere from access to the arc and leads to the production of a superior weld.

In the co-pending United States patent application Serial No. 481,023 (now Patent No. 2,408,175, dated September 24, 1945) I have proposed to carry out electric welding under the surface of water, particularly beneath the sea, but in this case the water is a conductor of electricity and special precautions have to be taken to ensure that no leakage of current occurs from the surface of the electrode and that no electrolytic action goes on between the electrode and the sea water. In the present invention, on the other hand, the liquid being chosen so as to be a non-conductor of electricity, precautions to prevent the leakage of current or electrolysis become unnecessary.

In one form of the invention the liquid may be a hydrocarbon, such as mineral oil.

The electrodes to be employed should preferably be covered with a flux coating to stabilise the arc and the flux should be rendered impervious to the liquid in which the weld is effected by impregnating or coating the flux with a protective varnish or other compound which is resistant to the liquid in which the process is carried out.

The invention is of value in enabling repairs to be effected in the interior of vessels or pipes used for the conveyance or storage of oil without emptying such vessels or pipes and in some cases even without interfering with the continued use of the apparatus. It will be appreciated that if an oil-containing vessel leaks and is emptied before repair there is a danger of the production of explosive fumes from oil which may remain upon the walls but if the vessel is full of oil and the weld is carried out in accordance with the present invention such danger is obviated.

The invention is not however limited to welding in vessels which are normally flooded with oil because in many instances it will be found that better welds are obtained by effecting them beneath the surface of oil even on parts which could be welded dry.

It has been found that welds carried out in accordance with this invention are softer and superior to similar welds carried out under water or even in the air. Thus, for example, cast iron parts which would otherwise crack during welding can be successfully welded according to the present invention.

The accompanying drawing is a diagrammatic view of a tank illustrating apparatus in which the invention may be carried into effect, the tank being shown partly in section in order that the interior of the parts may be seen.

In the drawing, 11 represents a metal tank which is filled with mineral oil 12. Resting on the bottom of the tank are metal supports 13, 14 on which are laid two plates 15, 16 which are to be joined together along the line 17. An insulated handle 18 supports a clamp 19 to receive a welding electrode 20 fed with current by a flexible cable 21. The metal tank itself is connected by a cable 22 to the other pole of the electric supply.

The electrode 20 is covered with a flux coating 24. The plates 15, 16 are in electrical connection with the tank through the metal supports 13, 14.

The following are examples of particular instances of a successful weld carried out in accordance with the present invention:

*Example 1*

Two mild steel plates of a thickness of one-quarter of an inch were laid together edge to edge in a tank, such as tank 11, and flooded with mineral lubricating oil to a depth of six inches above the plates. The plates were in electrical contact with the metal tank. An electrode 20 was employed having a diameter of 0.16 inch and coated with a flux 24 of the usual kind adopted for welding in air. This electrode was of the kind which is sold on the market as the "Lincoln Transweld" and the material of the electrode itself consisted of mild steel. Prior to use in the process the electrode was varnished with a coating of polyvinyl chloride in order to prevent the oil from penetrating the pores of the flux. The electrode was placed in holder 19 connected to an electric supply derived from a welding machine, the operator being outside the tank and the holder above the surface of the oil. The machine was adjusted to give an open circuit voltage of 70 volts and 35 volts across the arc when struck. A current of 180 amperes was employed and the electrode was allowed to lie in contact with the metal of the seam at an angle of about 30° to the plane of the plates, as shown in the drawing, so that the insulating flux coating rested upon the plate and the arc length was stabilised. As the electrode burned away the operator fed it down toward the seam in the direction of arrow 23 so that it moved parallel to itself, the angle of the electrode to the plates remaining constant and in this way the arc was caused to travel along the seam. A perfect and even welded seam resulted in which the weld metal was quite soft and contained no carbon inclusions.

*Example II*

In this case the general arrangements and conditions were similar to those set out in Example I and the parts to be welded consisted of a broken iron casting. The casting was chipped out along the line of the crack to afford a groove along the joint to be welded and was immersed in the oil in the tank 11 aforesaid and welded with a mild steel electrode as already described. It was found that a satisfactory joint was effected without leading to cracking of other parts of the casting as would have been expected had the repair been effected in the atmosphere. In this way the expense and difficulty which attends the use of muffle furnaces for preheating the work was obviated.

I claim:

1. A process of electric arc welding wherein metal pieces to be welded are immersed in a hydrocarbon oil with a seam between the pieces in proper relative position, an electrode is employed, covered with a flux, to stabilise the arc, the flux is rendered impervious to the hydrocarbon oil by impregnation with a protective compound and the weld is effected by striking an arc between the electrode and the work so as to deposit molten metal from the arc on to the pieces to be welded and form a seam along the joint thereof.

2. A process of repair of oil-containing vessels consisting in effecting the repairs by arc welding from within the vessels while these are filled with a hydrocarbon oil.

3. A process of joining cast iron parts, characterised by effecting a junction beneath the surface of a hydrocarbon oil by arc welding.

4. A process of electric arc welding of electrically conducting bodies in which the parts to be joined are submerged in a hydrocarbon oil and in which the electric arc is struck and the weld completed beneath the surface of said oil.

5. A process as defined in claim 4 in which the welding electrode to be used is first coated with an arc-stabilizing flux and then with a substance capable of rendering said flux impervious to said oil.

PAUL PEILLON.

REFERENCES CITED

The following references are of record in the file of this patent:

UNITED STATES PATENTS

| Number | Name | Date |
| --- | --- | --- |
| 419,032 | Coffin | Jan. 7, 1890 |
| 1,055,261 | Ellinger | Mar. 4, 1913 |
| 1,605,071 | Ronci | Nov. 2, 1926 |

OTHER REFERENCES

Welding Handbook, 1942 edition, page 719, American Welding Society, 33 West 39th Street, New York, New York.